(12) United States Patent
Rauch et al.

(10) Patent No.: US 12,472,861 B2
(45) Date of Patent: Nov. 18, 2025

(54) RAMP SUPPORT FOR PICKUP TRUCK TAILGATE

(71) Applicant: GM Global Technology Operations LLC, Detroit, MI (US)

(72) Inventors: Owen Rauch, Howell, MI (US); David M. Cummings, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 386 days.

(21) Appl. No.: 18/311,497

(22) Filed: May 3, 2023

(65) Prior Publication Data

US 2024/0367573 A1 Nov. 7, 2024

(51) Int. Cl.
*B60P 1/43* (2006.01)
*B62D 33/027* (2006.01)
*B62D 33/03* (2006.01)

(52) U.S. Cl.
CPC .......... *B60P 1/435* (2013.01); *B62D 33/0273* (2013.01); *B62D 33/03* (2013.01)

(58) Field of Classification Search
CPC ..... B60P 1/435; B62D 33/0273; B62D 33/03; B62D 33/027
USPC ................... 296/57.1, 61, 26.08, 26.1, 26.11
See application file for complete search history.

(56) References Cited

U.S. PATENT DOCUMENTS

| | | | | |
|---|---|---|---|---|
| 3,756,440 A | * | 9/1973 | Raap | B60P 1/435 296/61 |
| 5,971,465 A | * | 10/1999 | Ives | B60P 1/435 296/61 |
| 6,575,516 B2 | * | 6/2003 | Webber | B62D 33/0273 296/61 |
| 6,692,055 B2 | * | 2/2004 | Schilling | B62D 33/0273 296/26.11 |
| 9,346,390 B1 | * | 5/2016 | Croswhite | B60P 1/435 |
| 11,453,325 B1 | * | 9/2022 | Michalec | B62D 33/0273 |
| 2006/0045703 A1 | * | 3/2006 | Dougherty | B60P 1/435 414/537 |
| 2008/0042464 A1 | * | 2/2008 | Hutchins, Jr. | B60R 3/02 296/61 |

* cited by examiner

*Primary Examiner* — Amy R Weisberg
*Assistant Examiner* — Denise Lynne Esquivel
(74) *Attorney, Agent, or Firm* — CANTOR COLBURN LLP (57) ABSTRACT

A tailgate for a pickup truck, in accordance with a non-limiting example, includes a body member having a first lateral side, a second lateral side that is opposite the first lateral side, a first edge configured to pivotally connect with a vehicle body, a second edge, and a surface extending between the first lateral side, the second lateral side, the first edge, and the second edge. A ramp support member extends between the first lateral side and the second lateral side at the second edge, the ramp support member including a first end and a second end.

20 Claims, 8 Drawing Sheets

RAMP SUPPORT FOR PICKUP TRUCK TAILGATE

INTRODUCTION

Pickup trucks are often used to transport other vehicles such as all-terrain vehicles (ATV's), motorcycles, lawn mowers, and the like. Over the years, various methods for moving a vehicle into a pickup truck bed have been developed. The vehicle may be physically lifted into the truck bed, the vehicle and the truck bed may be arranged at similar heights such as through the use of a loading dock, a platform, or raised area of earth, or ramps may be used.

Ramps allow the vehicle to be driven, pushed, or pulled over a tailgate and into the truck bed. Ramps include a first end supported on, for example, the ground, and a second end supported on a lip of the tailgate. Often times the first end and the second end may be angled to match the ground and/or the lip of the tailgate. Occasionally, particularly when loading larger, heavier items, the ramp may slide along the ground or slip off the lip of the tailgate. A sliding ramp may result in damage to the item being loaded or the pickup truck itself. Accordingly, it is desirable to provide a system for securing a ramp to a tailgate to mitigate slipping and improve stability.

SUMMARY

A tailgate for a pickup truck, in accordance with a non-limiting example, includes a body member having a first lateral side, a second lateral side that is opposite the first lateral side, a first edge configured to pivotally connect with a vehicle body, a second edge, and a surface extending between the first lateral side, the second lateral side, the first edge, and the second edge. A ramp support member extends between the first lateral side and the second lateral side at the second edge, the ramp support member including a first end and a second end.

In addition to one or more of the features described herein a first latch pin receiver mounted at the first lateral side and a second latch pin receiver mounted at the second lateral side, the ramp support member being connected to the body member through the first latch pin receiver and the second latch pin receiver.

In addition to one or more of the features described herein the ramp support member includes a first support bracket coupled to the first end of the ramp support member, the first support bracket including a first latch pin received by the first latch pin receiver, and a second support bracket coupled to the second end of the ramp support member, the second support bracket including a second latch pin received by the second latch pin receiver on the tailgate.

In addition to one or more of the features described herein the ramp support member includes a first section coupled to the first support bracket and a second section coupled to the second support bracket, the second section being slidingly received by the first section.

In addition to one or more of the features described herein the first support bracket includes a first flange that extends over the surface and the second support bracket includes a second flange that extends over the surface, the first flange and the second flange engaging the tailgate to support the ramp support member.

In addition to one or more of the features described herein a first support bracket includes a first end portion connected to the first end of the ramp support member and a second end portion pivotally connected to the first lateral side of the body member and a second support bracket includes a first end section connected to the second end of the ramp support member and a second end section pivotally connected to the second lateral side of the body member.

In addition to one or more of the features described herein the surface includes a recess extending between the first lateral side and the second lateral side, the recess being selectively receptive of the ramp support member.

In addition to one or more of the features described herein the first lateral side includes a first recess portion selectively receptive of the first support bracket and the second lateral side includes a second recess portion selectively receptive of the second support bracket.

In addition to one or more of the features described herein the second edge includes a recessed pocket, the ramp support member being supported in the recessed pocket at the second edge.

A vehicle, in accordance with a non-limiting example, includes a body including a passenger compartment, and a tailgate pivotally mounted to the vehicle. The tailgate includes a body member having a first lateral side, a second lateral side that is opposite the first lateral side, a first edge configured to pivotally connect with the body, a second edge, and a surface extending between the first lateral side, the second lateral side, the first edge, and the second edge. A ramp support member extends between the first lateral side and the second lateral side at the second edge, the ramp support member including a first end and a second end.

In addition to one or more of the features described herein a first latch pin receiver is mounted at the first lateral side and a second latch pin receiver is mounted at the second lateral side, the ramp support member being rotatably connected to the body at the first latch pin receiver and the second latch pin receiver.

In addition to one or more of the features described herein the ramp support member includes a first support bracket coupled to the first end of the ramp support member, the first support bracket including a first latch pin received by the first latch pin receiver and a second support bracket coupled to the second end of the ramp support member, the second support bracket including a second latch pin received by the second latch pin receiver on the tailgate.

In addition to one or more of the features described herein the ramp support member includes a first section coupled to the first support bracket and a second section coupled to the second support bracket, the second section being slidingly received by the first section.

In addition to one or more of the features described herein the first support bracket includes a first flange that extends over the surface and the second support bracket includes a second flange that extends over the surface, the first flange and the second flange engaging the tailgate to support the ramp support member.

In addition to one or more of the features described herein a first support bracket includes a first end portion connected to the first end of the ramp support member and a second end portion pivotally connected to the first lateral side of the body member and a second support bracket includes a first end section connected to the second end of the ramp support member and a second end section pivotally connected to the second lateral side of the body member.

In addition to one or more of the features described herein the surface includes a recess extending between the first lateral side and the second lateral side, the recess being selectively receptive of the ramp support member.

In addition to one or more of the features described herein the first lateral side includes a first recess portion selectively receptive of the first support bracket and the second lateral side includes a second recess portion selectively receptive of the second support bracket.

In addition to one or more of the features described herein the second edge includes a recessed pocket, the ramp support member being supported in the recessed pocket at the second edge.

In addition to one or more of the features described herein, a support member includes a first end, a second end, and an intermediate portion, a first mounting bracket is coupled to the first end of the support member, the first mounting bracket including a first latch pin configured to be received in a first latch pin receiver on the pickup truck tailgate, and a second mounting bracket is coupled to the second end of the support member, the second mounting bracket including a second latch pin configured to be received in a second latch pin receiver on the pickup truck tailgate.

In addition to one or more of the features described herein the support member includes a first section coupled to the first mounting bracket and a second section coupled to the second mounting bracket, the second section being slidingly received by the first section.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
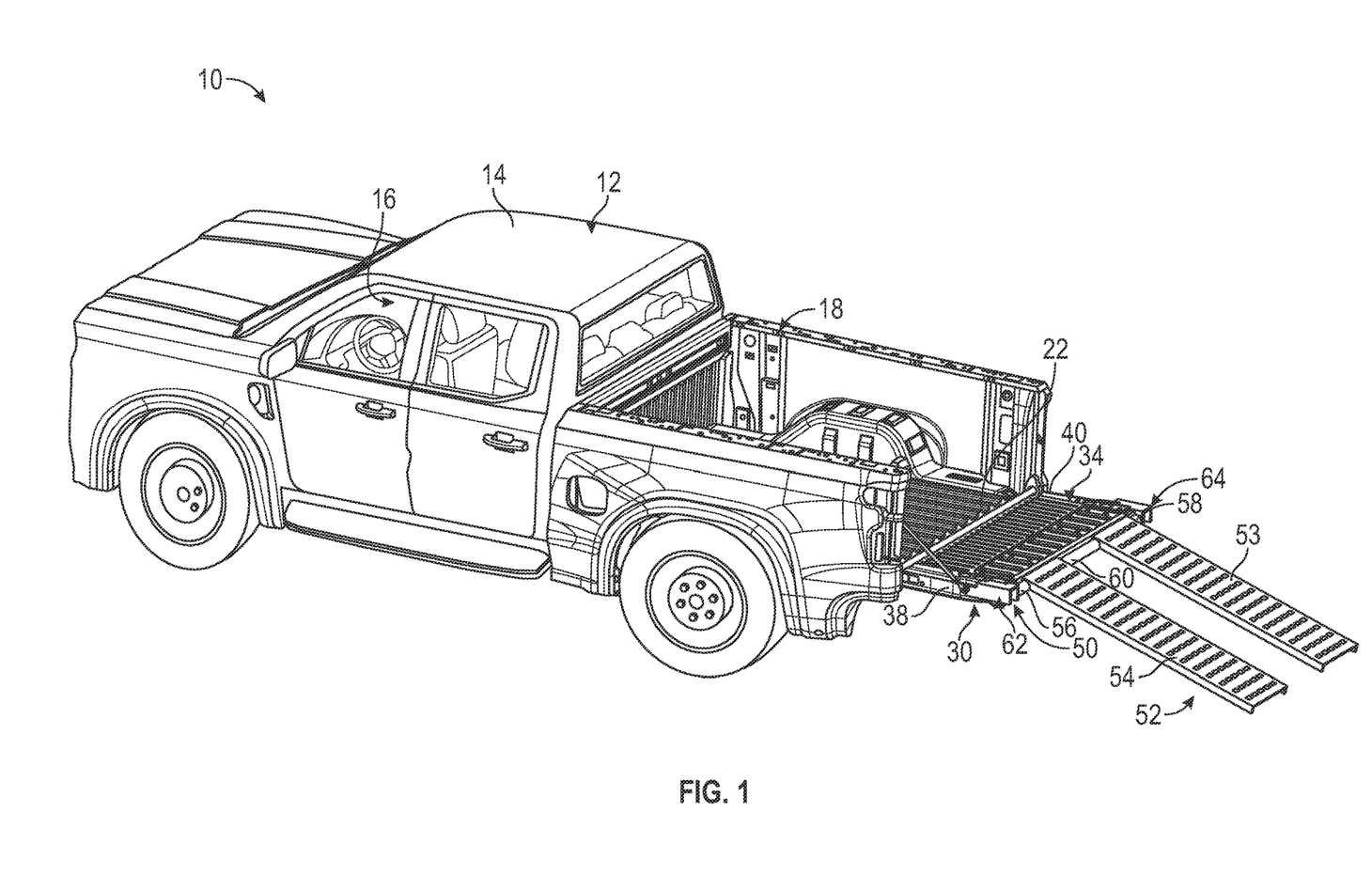
FIG. 1 is a perspective view of a pickup truck including a tailgate having a ramp support member, in accordance with a non-limiting example.

A vehicle, in accordance with a non-limiting example, is indicated generally at 10 in FIG. 1. Vehicle 10 is shown in the form of a pickup truck 12 having a body 14 that defines a passenger compartment 16 and a cargo box 18. Body 14 includes a uni-body construction, e.g., a vehicle body and a frame are formed as a single component. However, it should be understood that various body types are contemplated including vehicle bodies and/or cargo boxes that are mounted to a frame (not shown). Cargo box 18 is mounted aft of passenger compartment 16. Of course, it should be understood that cargo box 18 may, in the alternative, be integrally formed with passenger compartment 16. Cargo box 18 includes a cargo bed 22 and a tailgate 30. Tailgate 30 is pivotally mounted to cargo box 18 in a manner known in the art.

Figure 2:
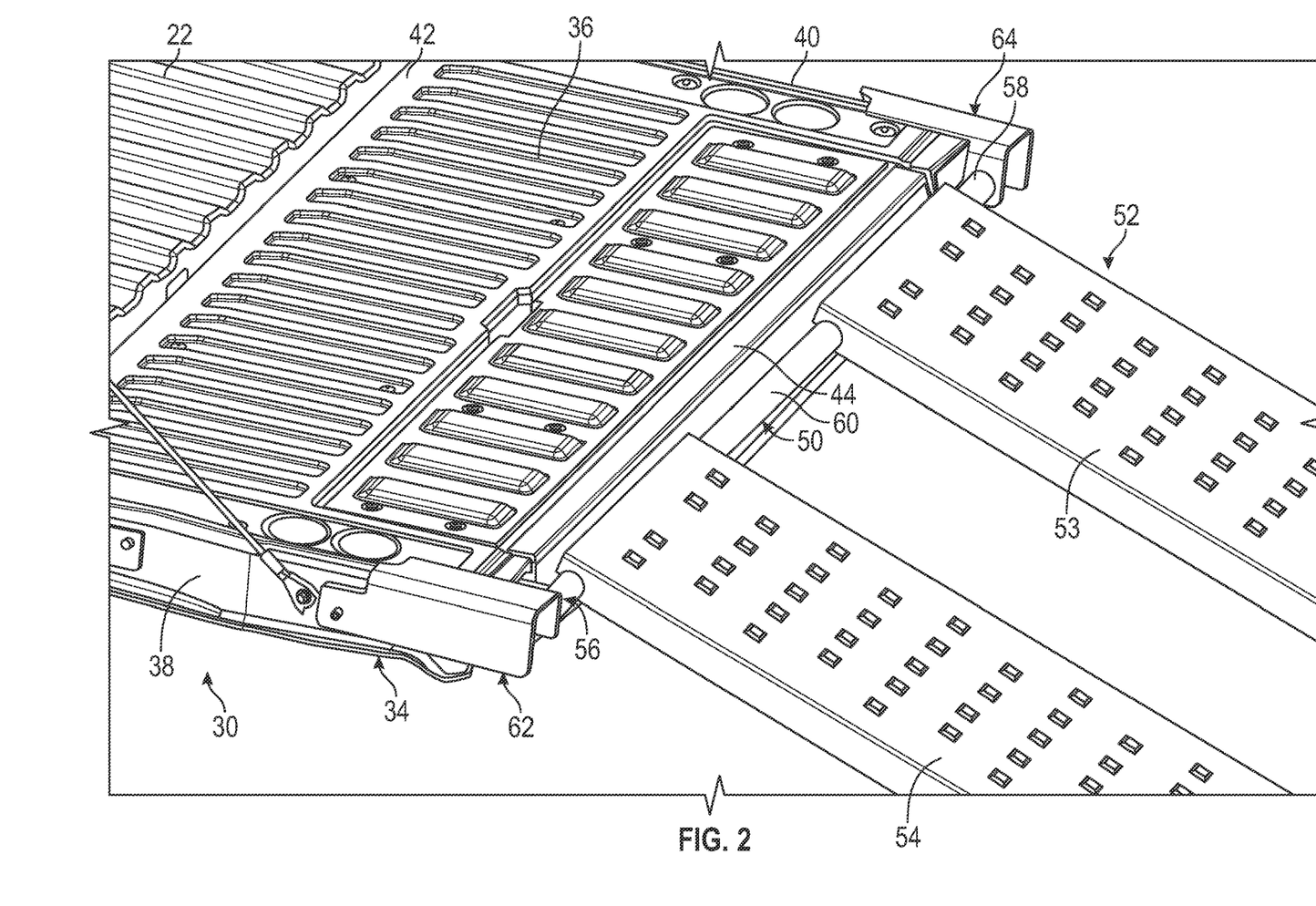
FIG. 2 is a detail view of the ramp support member coupled to the tailgate of FIG. 1 supporting a ramp, in accordance with a non-limiting example.
Figure 3:
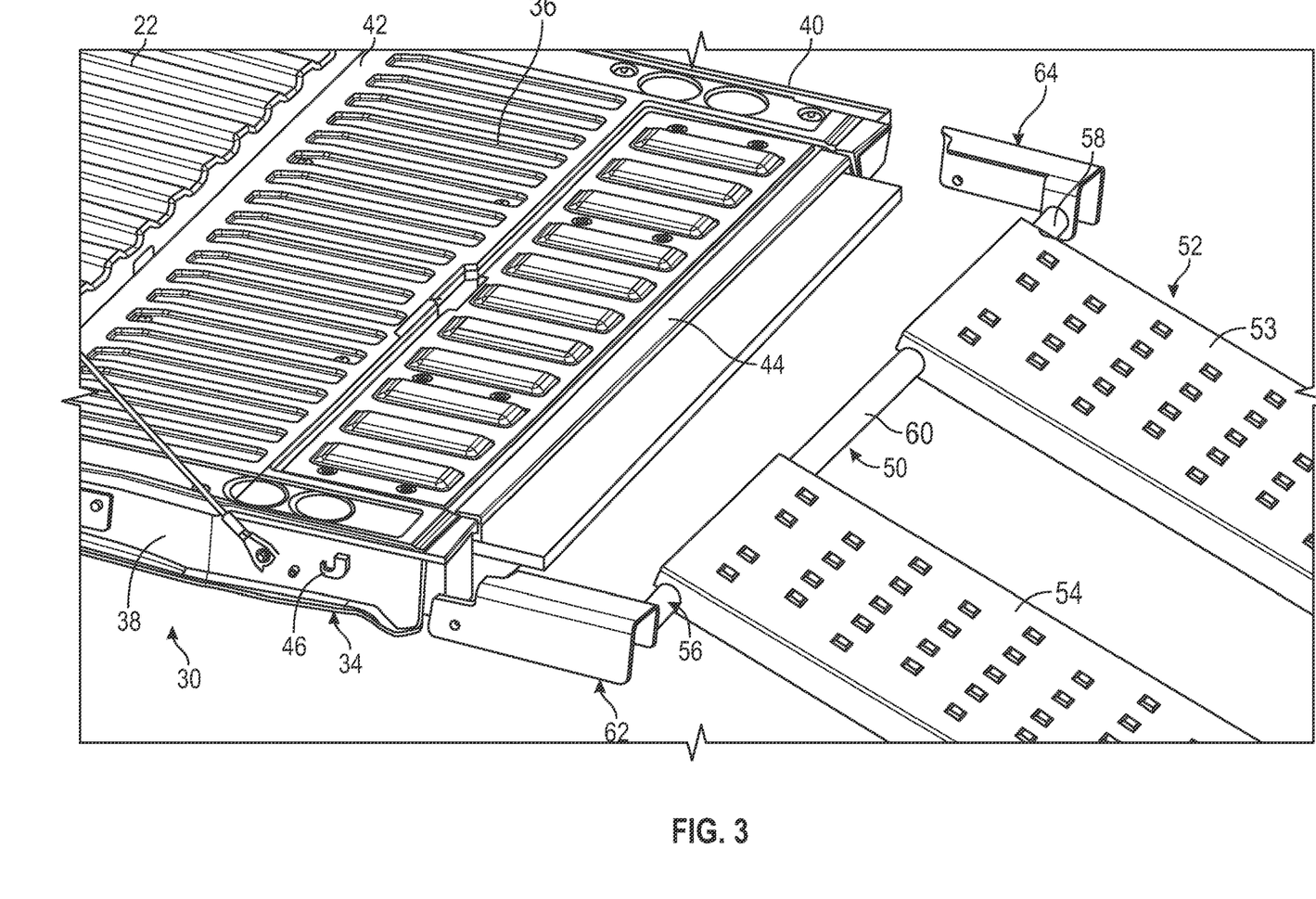
FIG. 3 is a disassembled view of the tailgate of FIG. 2, in accordance with a non-limiting example.
Figure 4:
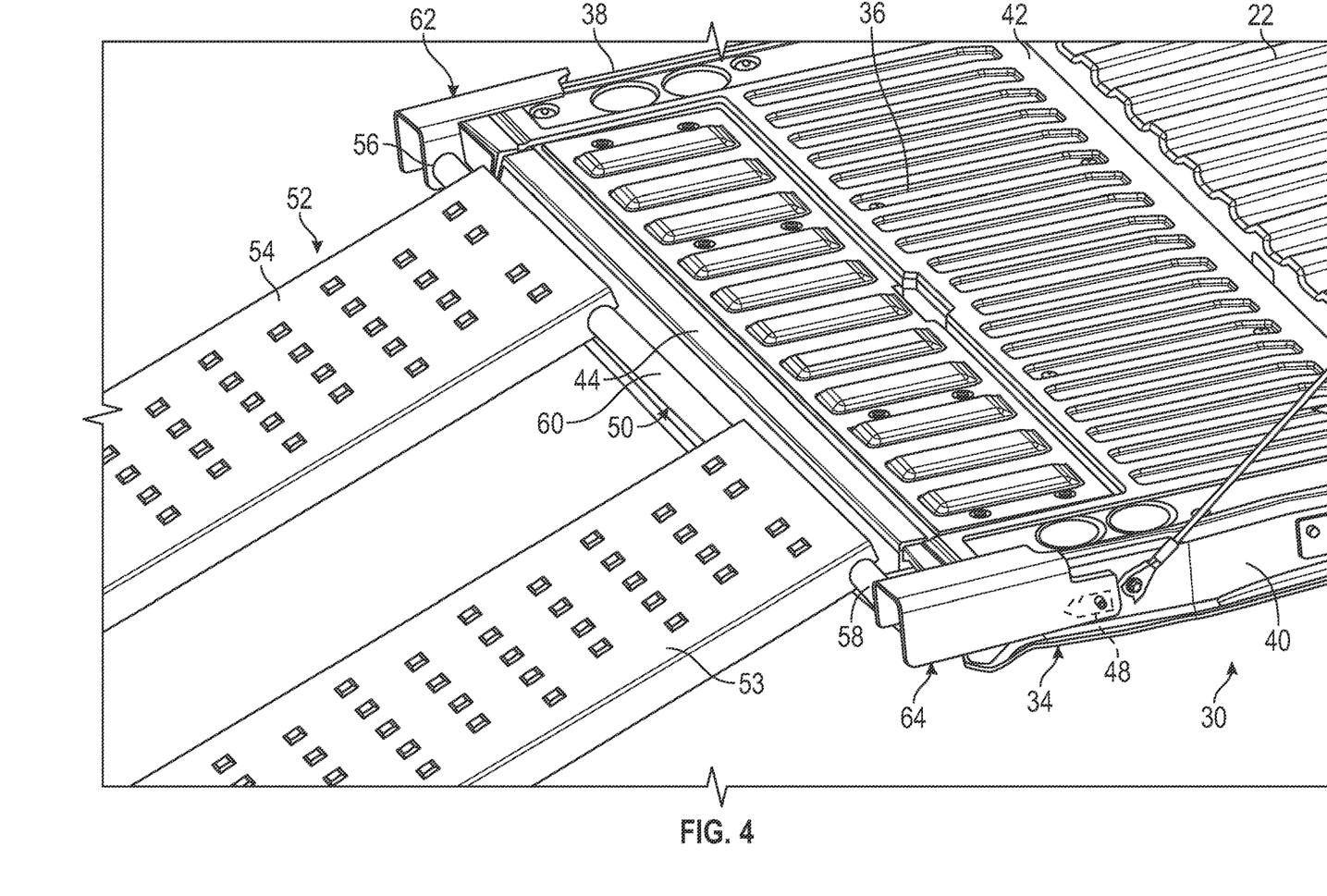
FIG. 4 is an upper right view of the tailgate of FIG. 2, in accordance with a non-limiting example.

Referring to FIGS. 2, 3, and 4, tailgate 30 includes a body member 34 including a surface 36 bounded by a first lateral side 38, a second lateral side 40 arranged opposite to first lateral side 38, a first edge 42 that is pivotally connected with cargo box 18, and a second edge 44. A first latch pin receiver 46, FIG. 3, is arranged on first lateral side 38 adjacent to second edge 44. A second latch pin receiver 48, FIG. 4, is arranged on second lateral side 40 adjacent to second edge 44. First and second latch pin receivers 46 and 48 selectively engage with latch pins (not shown) on cargo box 18 to retain tailgate 30 in a closed position. First and second latch pin receivers 46 and 48 may be selectively disengaged from the latch pins when it is desired to open tailgate 30.

In a non-limiting example, tailgate 30 includes a ramp support member 50 arranged at second edge 44. Ramp support member 50 provides positive retention of a ramp 52 that is coupled to tailgate 30. Ramp 52 includes a first ramp member 53 and a second ramp member 54 that are independently connected to ramp support member 50. The positive retention prevents ramp 52 from sliding/shifting or otherwise inadvertently falling off and disengaging from tailgate 30. In the non-limiting example shown, ramp support member 50 is detachably mounted to tailgate 30 through first latch pin receiver 46 and second latch pin receiver 48.

Ramp support member 50 includes a first end 56, a second end 58, and an intermediate portion 60 that extends between first end 56 and second end 58. A first support bracket 62 is coupled to first end 56 and a second support bracket 64 is coupled to second end 58. First support bracket 62 and second support bracket 64 act as an interface between ramp support member 50 and tailgate 30. In a non-limiting example, ramp support member 50 includes a generally round cross-section. The shape of ramp support member 50 allows ramp 52 to be readily adjustable or pivotable to accommodate various ramp angles and also allows lateral adjustment of first ramp member 53 and second ramp member 54.

Figure 5:
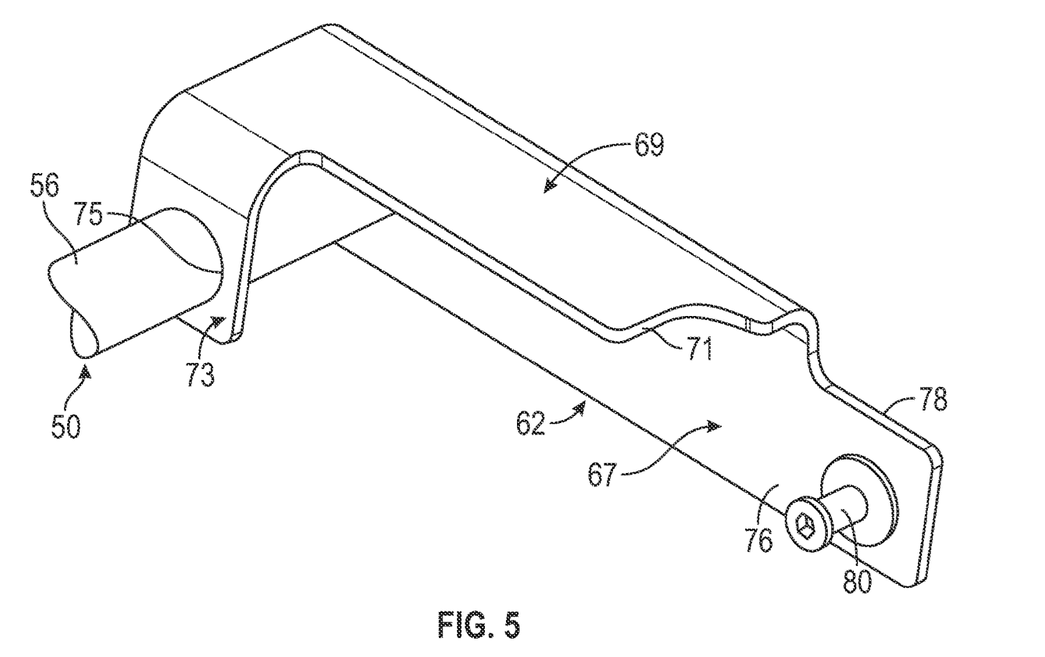
FIG. 5 is an upper right perspective view of a first mounting bracket of the ramp support member of FIG. 2, in accordance with a non-limiting example.
Figure 6:
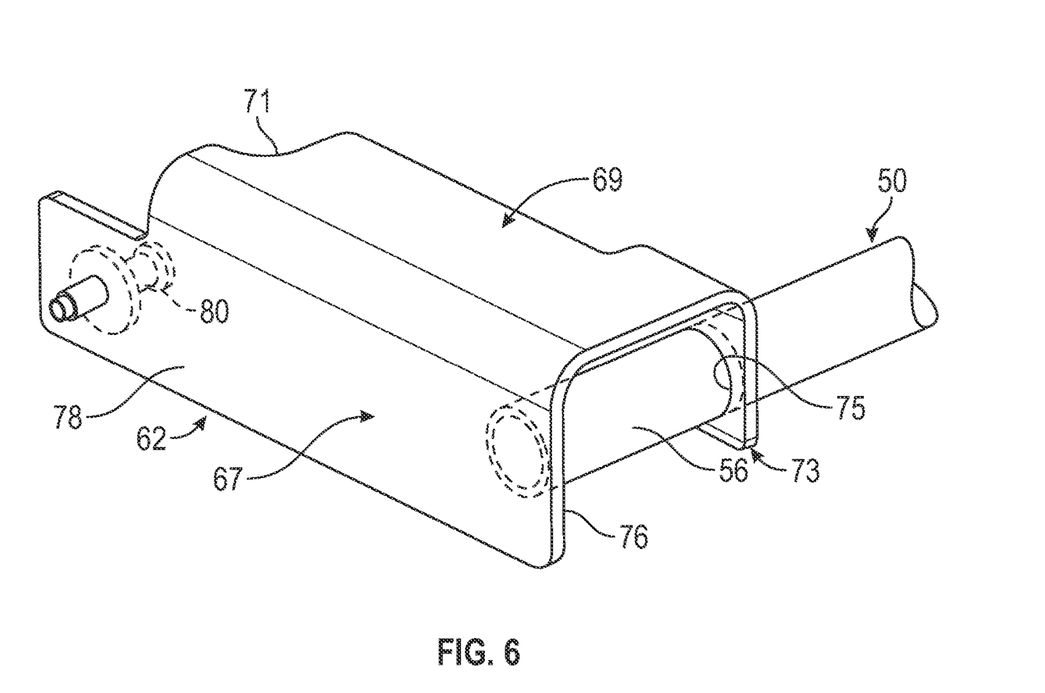
FIG. 6 is an upper left perspective view of the first mounting bracket of FIG. 5, in accordance with a non-limiting example.

Reference will now follow to FIGS. 5 and 6 in describing first support bracket 62 with an understanding that second support bracket 64 is similarly formed. First support bracket 62 includes a first portion 67 and a second portion 69 that extends substantially perpendicularly from first portion 67. Second portion 69 defines a flange 71 that may engage with, for example, surface 36 of tailgate 30. A third portion 73 extends substantially perpendicularly downwardly from second portion 69. Third portion 73 includes an opening 75 that receives first end 56 of ramp support member 50. Ramp support member 50 may be slidingly received in opening 75 so that a spacing between first support bracket 62 and second support bracket 64 may be adjusted to accommodate tailgates having different widths.

In a non-limiting example, first portion 67 includes an inner surface 76 which, when installed, faces first lateral side 38 of tailgate 30 and an outer surface 78. A first latch pin 80 projects outwardly from inner surface 76. Latch pin 80 is received by first latch pin receiver 46 to connect first support bracket 62 to first lateral side 38. First and second support brackets 62 are coupled to first lateral side 38 and second lateral side 40 by inserting first latch pin 80 on first support bracket 62 in first latch pin receiver 46 and a second latch pin 82 on second support bracket 64 in second latch pin receiver 48. First and second support brackets 62 and 64 may then rest on surface 36 of tailgate 30 to support ramp support member 50. At this point, ramp 52 may be attached and used to direct articles into cargo box 18.

Figure 7:
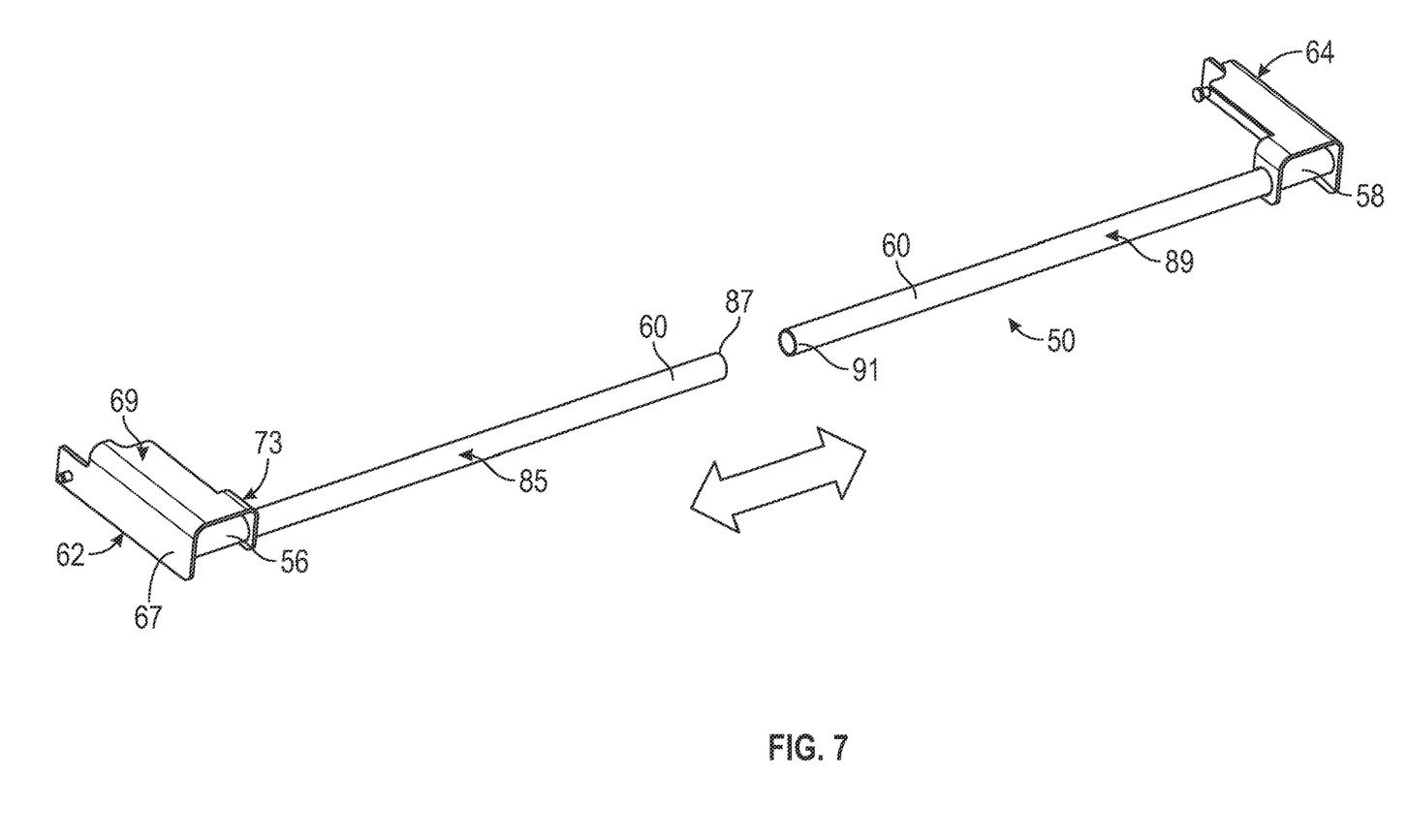
FIG. 7 depicts a ramp support member including telescoping support sections, in accordance with a non-limiting example.

In accordance with a non-limiting example, in addition to being detachable, ramp support member 50 may be configured to accommodate different sized tailgates having various widths, as discussed herein. As shown in FIG. 7, ramp support member 50 includes a first section 85 that extends from first support bracket 62 to a first terminal end 87. Ramp support member 50 is also shown to include a second section 89 that extends from second support bracket 64 to a second terminal end 91. First terminal end 87 is sized to slidingly receive second terminal end 91. In this manner, a distance between first support bracket 62 and second support bracket 64 may be adjusted in order to accommodate tailgates having different widths.

Figure 8:
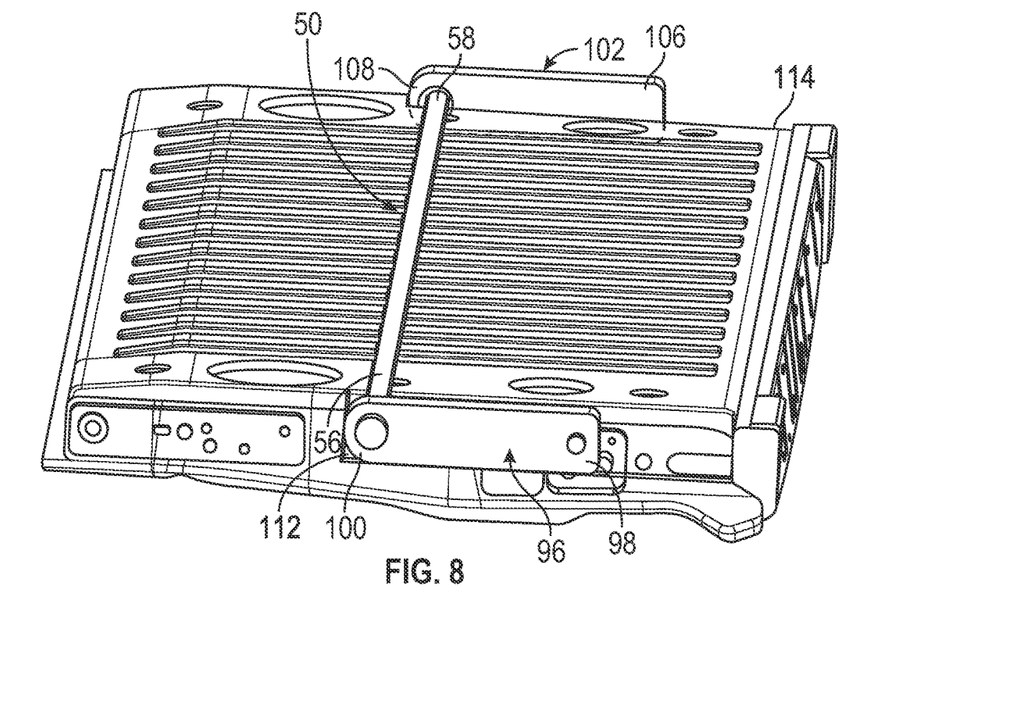
FIG. 8 is an upper left perspective view of a tailgate including a ramp support member shown in a stowed configuration, in accordance with a non-limiting example.
Figure 9:
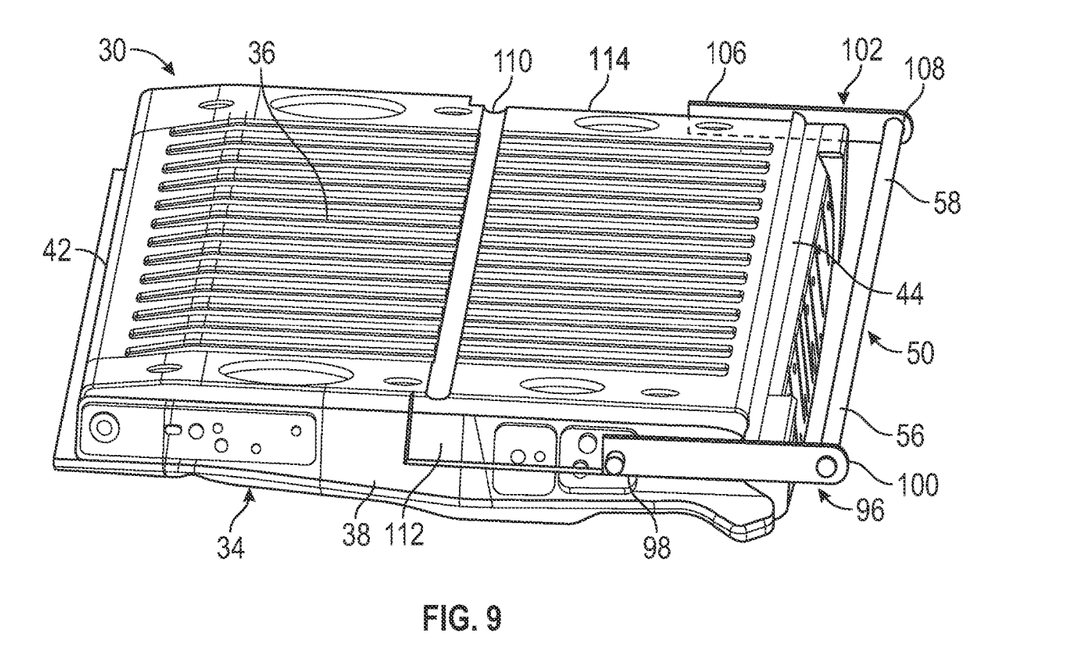
FIG. 9 is an upper left perspective view of the tailgate of FIG. 8 showing the ramp support member in a deployed configuration, in accordance with a non-limiting example.

Reference will now follow to FIGS. 8 and 9 in describing ramp support member 50 in accordance with another non-limiting example. In the non-limiting example shown, first end 56 of ramp support member 50 is coupled to a first support bracket 96. First support bracket 96 includes a first end portion 98 pivotally connected to first lateral side 38 of tailgate 30 and a second end portion 100 connected to first end 56. Second end 58 of ramp support member 50 is connected to a second support bracket 102. Second support bracket 102 includes a first end section 106 pivotally connected to second lateral side 40 of tailgate 30 and a second end section 108 is connected to second end 58.

In a non-limiting example, a recess 110 extends across and into surface 36 of tailgate 30. Recess 110 extends between first lateral side 38 and second lateral side 40. Recess 110 is sized to receive ramp support member 50. A first recessed portion 112 is formed in first lateral side 38 and a second recessed portion 114 is formed in second lateral side 40 of tailgate 30. First recessed portion 112 is sized to receive first support bracket 96 and second recessed portion 114 is sized to receive second support bracket 102. In this manner, ramp support member 50 forms part of vehicle 10 and may transition between a stowed configuration (FIG. 8) and a deployed configuration (FIG. 9). In the stowed configuration ramp support member 50 as well as first support bracket 96 and second support bracket 102 are captured by surface 36 of tailgate 30.

Figure 10:
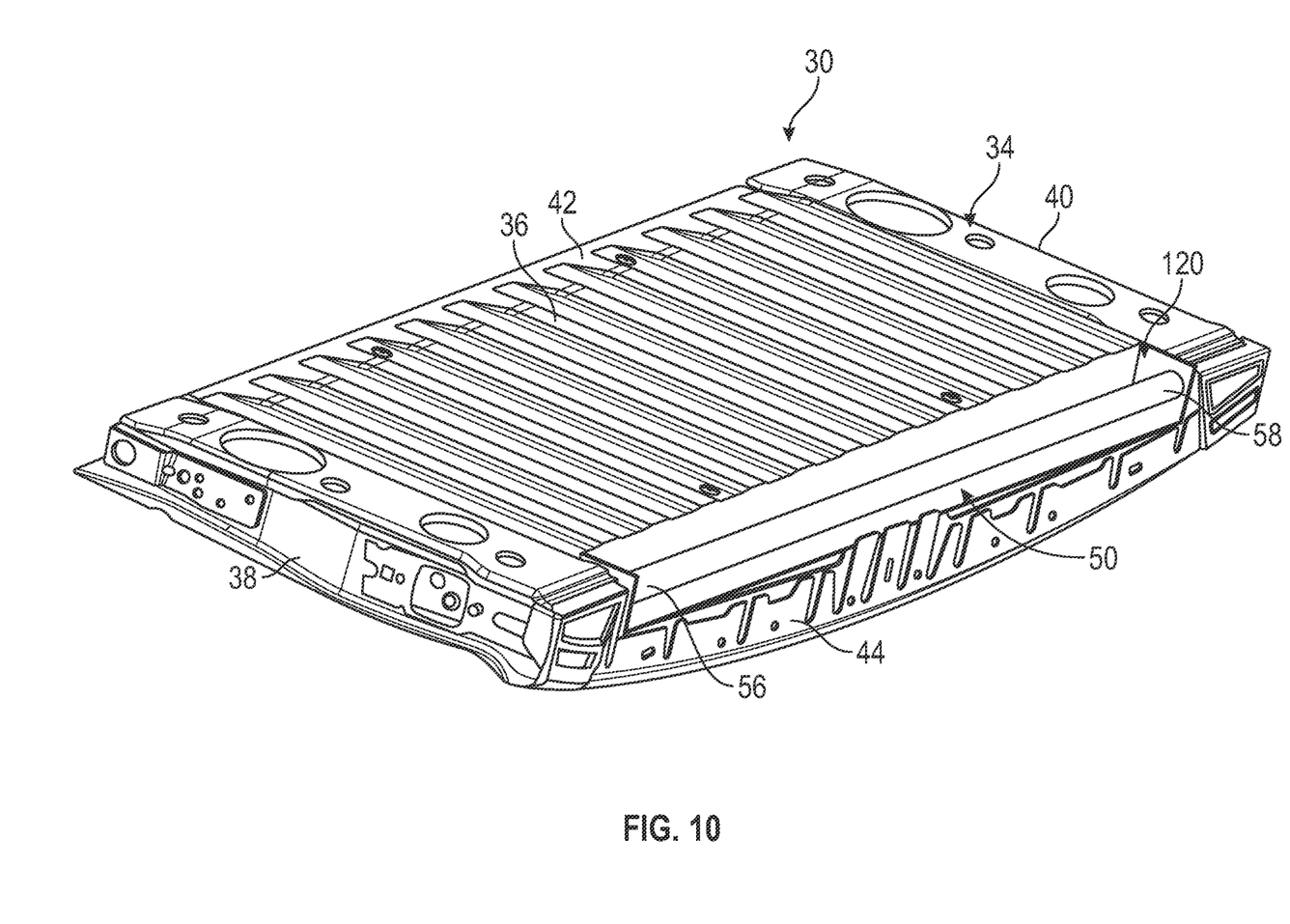
FIG. 10 is an upper left perspective view of the ramp support member, in accordance with another non-limiting example.

FIG. 10 depicts ramp support member 50 in accordance with yet another non-limiting example. Tailgate 30 is shown to include a recessed pocket 120 formed in second edge 44. Ramp support member 50 is arranged in recessed pocket 120. That is, first end 56 and second end 58 of ramp support member 50 are fixedly connected to second edge 44 of tailgate 30. In this manner, a user simply need open tailgate 30 to expose ramp support member 50 for use. At this point, it should be appreciated that the various examples shown present a positive attachment system for a utility ramp that is used to transport items into and out from a tailgate of a pickup truck. The particular example used may depend in owner preferences, vehicle trim packages and the like. Further, while show as being connected to the tailgate, the ramp support member may be connects to side walls of the cargo box or to bumper surfaces if the tailgate is removed.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A tailgate for a pickup truck comprising:
a body member including a first lateral side, a second lateral side that is opposite the first lateral side, a first edge configured to pivotally connect with a vehicle body, a second edge, and a surface extending between the first lateral side, the second lateral side, the first edge, and the second edge;
a ramp support member extending between the first lateral side and the second lateral side at the second edge, the ramp support member including a first end and a second end;
a first support bracket including a first end portion connected to the first end of the ramp support member and a second end portion pivotally connected to the first lateral side of the body member;
a second support bracket including a first end section connected to the second end of the ramp support member and a second end section pivotally connected to the second lateral side of the body member; and
a first latch pin receiver mounted at the first lateral side and a second latch pin receiver mounted at the second lateral side, the ramp support member being connected to the body member through the first latch pin receiver and the second latch pin receiver, wherein the surface includes a recess extending between the first lateral side and the second lateral side, the recess being selectively receptive of the ramp support member, and wherein the first lateral side includes a first recess portion selectively receptive of the first support bracket and the second lateral side includes a second recess portion selectively receptive of the second support bracket.

2. The tailgate according to claim 1, wherein the first support bracket including a first latch pin received by the first latch pin receiver; and wherein the second support bracket including a second latch pin received by the second latch pin receiver on the tailgate.

3. The tailgate according to claim 2, wherein the ramp support member includes a first section coupled to the first support bracket and a second section coupled to the second support bracket, the second section being slidingly received by the first section.

4. The tailgate according to claim 2, wherein the first support bracket includes a first flange that extends over the surface and the second support bracket includes a second flange that extends over the surface, the first flange and the second flange engaging the tailgate to support the ramp support member.

5. The tailgate according to claim 1, wherein the second edge includes a recessed pocket, the ramp support member being supported in the recessed pocket at the second edge.

6. A vehicle comprising:
a body including a passenger compartment; and
a tailgate pivotally mounted to the vehicle, the tailgate comprising:
a body member including a first lateral side, a second lateral side that is opposite the first lateral side, a first edge configured to pivotally connect with the body, a second edge, and a surface extending between the first lateral side, the second lateral side, the first edge, and the second edge;
a ramp support member extending between the first lateral side and the second lateral side at the second edge, the ramp support member including a first end and a second end;
a first latch pin receiver mounted at the first lateral side and a second latch pin receiver mounted at the second lateral side, the ramp support member being rotatably connected to the body at the first latch pin receiver and the second latch pin receiver;
a first support bracket including a first end portion connected to the first end of the ramp support member and a second end portion pivotally connected to the first lateral side of the body member; and
a second support bracket including a first end section connected to the second end of the ramp support member and a second end section pivotally connected to the second lateral side of the body member, wherein the surface includes a recess extending between the first lateral side and the second lateral side, the recess being selectively receptive of the ramp support member, and wherein the first lateral side includes a first recess portion selectively receptive of the first support bracket and the second lateral side includes a second recess portion selectively receptive of the second support bracket.

7. The vehicle according to claim 6, wherein the first support bracket including a first latch pin received by the first latch pin receiver; and wherein the second support bracket including a second latch pin received by the second latch pin receiver on the tailgate.

8. The vehicle according to claim 7, wherein the ramp support member includes a first section coupled to the first support bracket and a second section coupled to the second support bracket, the second section being slidingly received by the first section.

9. The vehicle according to claim 7, wherein the first support bracket includes a first flange that extends over the surface and the second support bracket includes a second flange that extends over the surface, the first flange and the second flange engaging the tailgate to support the ramp support member.

10. The vehicle according to claim 6, wherein the second edge includes a recessed pocket, the ramp support member being supported in the recessed pocket at the second edge.

11. The tailgate according to claim 1, wherein the ramp support member is shaped as a cylindrical rod.

12. The tailgate according to claim 1, wherein the first end portion of the first support brackets is U-shaped.

13. The tailgate according to claim 1, wherein the first end section of the second support brackets is U-shaped.

14. The tailgate according to claim 1, wherein the second end portion of the first support bracket is shaped as a flat plate.

15. The tailgate according to claim 1, wherein the second end section of the second support bracket is shaped as a flat plate.

16. The vehicle according to claim 6, wherein the ramp support member is shaped as a cylindrical rod.

17. The vehicle according to claim 6, wherein the first end portion of the first support brackets is U-shaped.

18. The vehicle according to claim 6, wherein the first end section of the second support brackets is U-shaped.

19. The vehicle according to claim 6, wherein the second end portion of the first support bracket is shaped as a flat plate.

20. The vehicle according to claim 6, wherein the second end section of the second support bracket is shaped as a flat plate.

* * * * *